US012633571B2

(12) United States Patent
Kim et al.

(10) Patent No.: US 12,633,571 B2
(45) Date of Patent: May 19, 2026

(54) ELECTROLYTE FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Sung Jin Kim, Daejeon (KR); Jin Hong Lee, Daejeon (KR); Myoung Lae Kim, Daejeon (KR); In Haeng Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 593 days.

(21) Appl. No.: 18/165,744

(22) Filed: Feb. 7, 2023

(65) Prior Publication Data

US 2023/0253627 A1 Aug. 10, 2023

(30) Foreign Application Priority Data

Feb. 9, 2022 (KR) ........................ 10-2022-0016868

(51) Int. Cl.

| | |
|---|---|
| ***H01M 10/0567*** | (2010.01) |
| ***H01M 4/38*** | (2006.01) |
| ***H01M 4/525*** | (2010.01) |
| ***H01M 10/0568*** | (2010.01) |
| ***H01M 10/0569*** | (2010.01) |
| *H01M 4/02* | (2006.01) |

(52) U.S. Cl.

CPC ....... *H01M 10/0567* (2013.01); *H01M 4/386* (2013.01); *H01M 4/525* (2013.01); *H01M 10/0568* (2013.01); *H01M 10/0569* (2013.01); *H01M 2004/027* (2013.01); *H01M 2004/028* (2013.01); *H01M 2300/0037* (2013.01); *H01M 2300/0051* (2013.01)

(58) Field of Classification Search

CPC ......... H01M 10/0567; H01M 10/0568; H01M 10/0569; H01M 4/386; H01M 4/525; H01M 2004/027; H01M 2004/028; H01M 2300/0037; H01M 2300/0051

See application file for complete search history.

(56) References Cited

U.S. PATENT DOCUMENTS

| | | | | |
|---|---|---|---|---|
| 2008/0311478 A1 | 12/2008 | Onuki et al. | | |
| 2012/0088160 A1* | 4/2012 | Zhang | ............... | H01M 10/0525 429/207 |

FOREIGN PATENT DOCUMENTS

| | | | |
|---|---|---|---|
| JP | 3633268 B2 | 3/2005 |
| KR | 10-2016-0029566 A | 3/2016 |
| KR | 10-2020-0051757 A | 5/2020 |

* cited by examiner

*Primary Examiner* — Uyen M Tran

(74) *Attorney, Agent, or Firm* — IP & T GROUP LLP

(57) ABSTRACT

An electrolyte for a lithium secondary battery according to exemplary embodiments may include a lithium salt; an organic solvent; and an additive including a lactone compound having an epoxy group. Accordingly, it is possible to provide an electrolyte for a lithium secondary battery having excellent high-temperature characteristics and a lithium secondary battery including the electrolyte.

12 Claims, 2 Drawing Sheets

[FIG. 1]
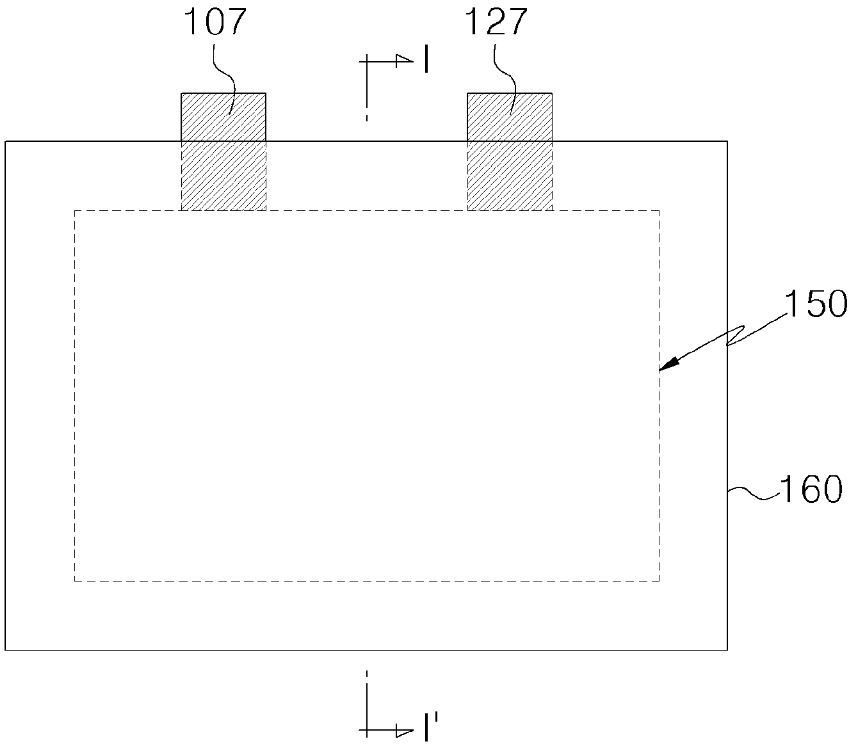

[FIG. 2]
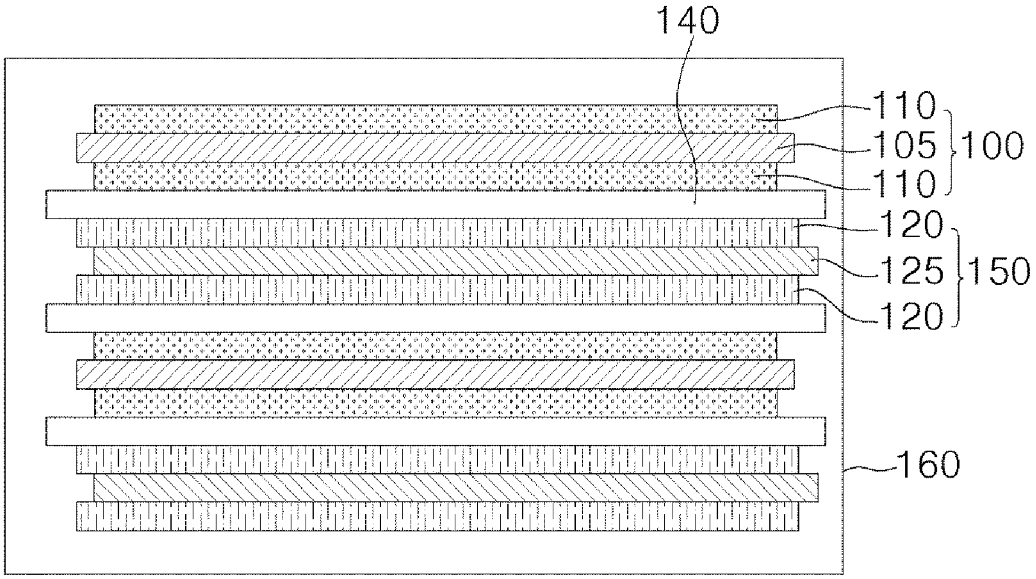
[FIG. 3]
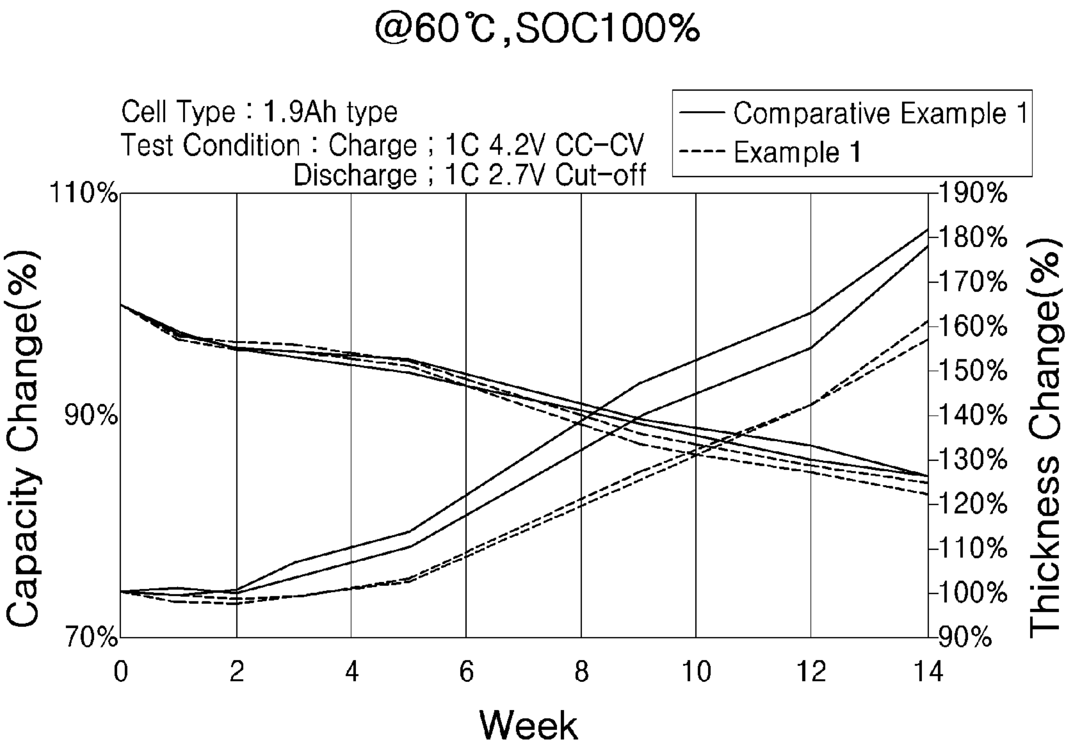

ELECTROLYTE FOR LITHIUM SECONDARY BATTERY AND LITHIUM SECONDARY BATTERY INCLUDING THE SAME

BACKGROUND OF THE INVENTION

1. Field of the Invention

The present invention relates to an electrolyte for a lithium secondary battery and a lithium secondary battery including the same. More specifically, the present invention relates to an electrolyte for a lithium secondary battery, which includes a lithium salt, an organic solvent and an additive, and a lithium secondary battery including the electrolyte.

2. Description of the Related Art

A secondary battery is a battery which can be repeatedly charged and discharged, and has been widely applied to portable electronic devices such as a mobile phone, a laptop computer, etc. or electric vehicles as a power source thereof.

A lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane interposed between the cathode and the anode; and an electrolyte in which the electrode assembly is impregnated in a case.

For example, the cathode may include a lithium metal oxide capable of reversibly intercalating and deintercalating lithium as a cathode active material.

Meanwhile, in the lithium secondary battery, structural deformation of the lithium metal oxide, side reactions of the electrolyte, and the like may occur at the time of repeated charging and discharging. In this case, life-span characteristics (e.g., capacity retention rate) of the lithium secondary battery may be reduced.

In particular, the lithium secondary battery is placed in a high-temperature environment at the time of repeated charging and discharging, as well as overcharging. In this case, the above-described problems are accelerated, thereby causing an expansion phenomenon of battery (an increase in the battery thickness due to gases generated inside the battery), an increase in the internal resistance of the battery, and a deterioration in life-span characteristics of the battery. Therefore, in order improve high-temperature characteristics by forming a film on the anode, researches on adding a gamma-butyrolactone (GBL) additive to the battery are being conducted.

For example, Korean Patent Publication Laid-Open No. 10-2016-0029566 discloses a method of adding a GBL additive to an electrolyte for a lithium secondary battery, thus to improve the performance of the lithium secondary battery. However, there are some limitations in providing sufficient operation reliability in the high-temperature environment.

SUMMARY OF THE INVENTION

An object of the present invention is to provide an electrolyte for a lithium secondary battery which has excellent high-temperature characteristics.

Another object of the present invention is to provide a lithium secondary battery including the electrolyte having excellent high-temperature characteristics.

To achieve the above objects, according to an aspect of the present invention, there is provided an electrolyte for a lithium secondary battery including: a lithium salt; an organic solvent; and an additive including a lactone compound represented by Formula 1 below:

[Formula 1]

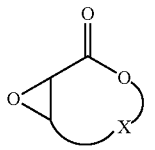

(in Formula 1, X is a substituted or unsubstituted $C_1$-$C_5$ alkylene group).

In one embodiment, the X may be an unsubstituted $C_1$-$C_3$ alkylene group.

In one embodiment, the lactone compound represented by Formula 1 may include 2,3-epoxy-γ-butyrolactone.

In one embodiment, the additive may be included in an amount of 0.1% to 10% by weight based on a total weight of the electrolyte.

In one embodiment, the additive may be included in an amount of 0.5% to 5% by weight based on the total weight of the electrolyte.

In one embodiment, the electrolyte may further include at least one auxiliary additive selected from the group consisting of a cyclic carbonate compound, a fluorine-substituted cyclic carbonate compound, a sultone compound, a cyclic sulfate compound and an oxalatophosphate compound.

In one embodiment, the auxiliary additive may be included in an amount of 1% to 10% by weight based on the total weight of the electrolyte.

In one embodiment, a weight ratio of the auxiliary additive to a weight of the additive in the electrolyte may be 0.5 to 10.

In one embodiment, the organic solvent may include a cyclic carbonate solvent and a linear carbonate solvent.

According to another aspect of the present invention, there is provided a lithium secondary battery including: a cathode which comprises a lithium metal oxide as a cathode active material; an anode disposed to face the cathode; and the above-described electrolyte for a lithium secondary battery.

In one embodiment, the cathode active material may include a lithium metal oxide containing nickel.

In one embodiment, the anode may include a silicon-based active material as an anode active material.

The electrolyte for a lithium secondary battery according to exemplary embodiments may implement a lithium secondary battery having improved initial performance (e.g., low resistance characteristics).

The electrolyte for a lithium secondary battery according to exemplary embodiments may form a robust solid electrolyte interphase (SEI) on the surface of the anode. Accordingly, it is possible to implement a lithium secondary battery having improved high-temperature storage characteristics (e.g., improved thickness increase rate and capacity retention rate, as well as an effect of preventing an increase in the resistance of the battery at a high temperature).

The electrolyte for a lithium secondary battery according to exemplary embodiments may implement a lithium secondary battery having improved high-temperature stability (e.g., an effect of suppressing gas generation rate in the high-temperature environment).

BRIEF DESCRIPTION OF THE DRAWINGS

The above and other objects, features and other advantages of the present invention will be more clearly understood from the following detailed description taken in conjunction with the accompanying drawings, in which:

FIG. 1 is a plan view schematically illustrating a lithium secondary battery according to exemplary embodiments;

FIG. 2 is a schematic cross-sectional view of the lithium secondary battery according to exemplary embodiments; and FIG. 3 is a graph illustrating result values of capacity retention rates and thickness increase rates at high temperature (60° C.) according to Example 1 and Comparative example 1.

DETAILED DESCRIPTION OF THE INVENTION

As used herein, the “X compound” may refer to a compound including an X unit attached to a matrix, etc. of the “X compound” and a derivative thereof.

As used herein, the “Ca-Cb” may refer to “the number of carbon (C) atoms of a to b.”

Electrolyte for Lithium Secondary Battery

An electrolyte for a lithium secondary battery according to exemplary embodiments may include: a lithium salt; an organic solvent; and an additive.

In one embodiment, the additive may include a lactone compound having an epoxy group.

The electrolyte for a lithium secondary battery according to exemplary embodiments may implement a lithium secondary battery having improved initial performance, high-temperature stability, and high-temperature storage characteristics.

Hereinafter, components of the present invention will be described in more detail.

Additive

The electrolyte for a lithium secondary battery according to exemplary embodiments may include an additive including a lactone compound having an epoxy group.

For example, the lactone compound having an epoxy group may be represented by Formula 1 below.

[Formula 1]

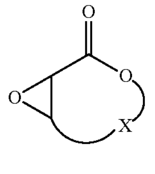

In Formula 1, X may be a substituted or unsubstituted $C_1$-$C_5$ alkylene group. Preferably, X may be an unsubstituted $C_1$-$C_3$ alkylene group.

For example, a carbon atom of a C═O bond and an oxygen atom of a C—O bond may be linked by the alkylene group to form a 4- to 7-membered ring.

For example, the alkylene group may mean a form ($-C_nH_{2n}-$) in which one hydrogen atom is separated from each of carbon atoms at both ends of alkane. For example, $-CH_2-CH_2-CH_2-$ may mean a propylene group.

For example, the meaning of “substituted” may mean that a hydrogen atom of the alkylene group is substituted with a substituent, such that the substituent can be further bonded to a carbon atom of the alkylene group. For example, the substituent may be at least one of halogen, a $C_1$-$C_6$ alkyl group, a $C_2$-$C_6$ alkenyl group, an amino group, a $C_1$-$C_6$ alkoxy group, a $C_3$-$C_7$ cycloalkyl group, and a 5- to 7-membered heterocycloalkyl group. In some embodiments, the substituent may be halogen or a C1-C6 alkyl group.

In one embodiment, the lactone compound having an epoxy group may include γ-butyrolactone (GBL) having an epoxy group. For example, when including the lactone compound having the epoxy group, a robust solid electrolyte membrane (SEI) may be formed on an anode. In this case, decomposition of organic solvents (e.g., EC, EMC, etc.) may be effectively prevented. Thereby, gas generation and an increase in the battery thickness may be significantly reduced.

In one embodiment, the lactone compound represented by Formula 1 may be 2,3-epoxy-γ-butyrolactone. For example, the 2,3-epoxy-γ-butyrolactone may be represented by Formula 2 below.

[Formula 2]

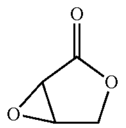

When the 2,3-epoxy-γ-butyrolactone is included in the electrolyte as an additive, a stable SEI film is formed on the anode, such that a lithium secondary battery having improved high-temperature storage characteristics may be implemented. For example, it is possible to improve the thickness increase rate and capacity retention rate, as well as an effect of preventing an increase in the resistance of the battery at high temperature.

In one embodiment, the additive may be included in an amount of 0.1% to 10% by weight (“wt. %”), 0.25 to 10 wt. %, or 0.5 to 5 wt. % based on a total weight of the electrolyte. In this case, it is possible to implement a lithium secondary battery having more improved high-temperature storage characteristics.

Auxiliary Additive

The electrolyte for a lithium secondary battery according to exemplary embodiments may further include an auxiliary additive together with the above-described additive.

In one embodiment, the auxiliary additive may be, for example, a cyclic carbonate compound, a fluorine-substituted cyclic carbonate compound, a sultone compound, a cyclic sulfonate compound, or an oxalatophosphate compound.

The auxiliary additive may be included in an amount of 0.1 to 10 wt. % or 1 to 7 wt. % based on the total weight of the electrolyte. In this case, it is possible to implement a lithium secondary battery having more improved high-temperature storage characteristics.

In one embodiment, a ratio of a weight of the auxiliary additive to a weight of the additive in the electrolyte may be 1 to 10, greater than 1 and 10 or less, 1.25 to 10, or 1.25 to 7. In this case, it is possible to implement a lithium secondary battery having more improved high-temperature storage characteristics.

The cyclic carbonate compound including a double bond may include, for example, vinylene carbonate (VC), vinyl ethylene carbonate (VEC) or the like.

The fluorine-substituted cyclic carbonate compound may include, for example, fluoroethylene carbonate (FEC).

The sultone compound may include, for example, 1,3-propane sultone, 1,3-propene sultone, 1,4-butane sultone or the like.

The cyclic sulfate compound may include, for example, 1,2-ethylene sulfate, 1,2-propylene sulfate or the like.

The oxalatophosphate compound may include, for example, lithium bis(oxalato)phosphate.

In one preferred embodiment, as the auxiliary additive, the fluorine-substituted cyclic carbonate compound, the sultone compound, the cyclic sulfate compounds, and the oxalatophosphate compounds may be used together.

When additionally including the auxiliary additive, durability and stability of the electrode may be further improved. The auxiliary additive may be included in an appropriate amount within a range that does not inhibit the movement of lithium ions in the electrolyte.

Organic Solvent and Lithium Salt

The organic solvent may include, for example, an organic compound which provides sufficient solubility to the lithium salt, the additive and the auxiliary additive, and does not have reactivity in the battery.

For example, the organic solvent may include at least one of a carbonate solvent, an ester solvent, an ether solvent, a ketone solvent, an alcohol solvent and a aprotic solvent.

In one embodiment, the organic solvent may include a carbonate solvent.

In some embodiments, the carbonate solvent may include a linear carbonate solvent and a cyclic carbonate solvent.

For example, the linear carbonate solvent may include at least one of dimethyl carbonate (DMC), ethyl methyl carbonate (EMC), diethyl carbonate (DEC), methyl propyl carbonate, ethyl propyl carbonate and dipropyl carbonate.

For example, the cyclic carbonate solvent may include at least one of ethylene carbonate (EC), propylene carbonate (PC) and butylene carbonate.

In some embodiments, the organic solvent may include a larger amount of the linear carbonate solvent than the cyclic carbonate solvent based on a volume.

For example, a mixing volume ratio of the linear carbonate solvent and the cyclic carbonate solvent may be 1:1 to 9:1, and preferably 1.5:1 to 4:1.

For example, the ester solvent may include at least one of methyl acetate (MA), ethyl acetate (EA), n-propyl acetate (n-PA), 1,1-dimethylethyl acetate (DMEA), methyl propionate (MP) and ethyl propionate (EP).

For example, the ether solvent may include at least one of dibutyl ether, tetraethylene glycol dimethyl ether (TEGDME), diethylene glycol dimethyl ether (DEGDME), dimethoxyethane, tetrahydrofuran (THF) and 2-methyltetrahydrofuran.

For example, the ketone solvent may include cyclohexanone.

For example, the alcohol solvent may include at least one of ethyl alcohol and isopropyl alcohol.

For example, the aprotic solvent may include at least one of a nitrile solvent, an amide solvent (e.g., dimethylformamide) and a dioxolane solvent (e.g., 1,3-dioxolane) and a sulfolane solvent.

The electrolyte includes a lithium salt, and the lithium salt may be expressed as $Li^+X^-$.

For example, the anion ($X^-$) of the lithium salt may be any one selected form $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In some embodiments, the lithium salt may include at least one of $LiBF_4$ and $LiPF_6$.

In one embodiment, the lithium salt may be included in a concentration of 0.01 to 5 M, and more preferably 0.01 to 2 M based on the organic solvent. Within the above concentration range, lithium ions and/or electrons may smoothly move during charging and discharging of the battery.

Lithium Secondary Battery

A lithium secondary battery according to exemplary embodiments may include: a cathode; an anode; a separation membrane interposed between the cathode and the anode; and an electrolyte including an organic solvent and a lithium salt.

Hereinafter, the lithium secondary battery according to exemplary embodiments will be described in more detail with reference to the drawings. FIGS. 1 and 2 are a schematic plan view and a cross-sectional view illustrating the lithium secondary battery according to exemplary embodiments, respectively. Specifically, FIG. 2 is a cross-sectional view taken on line I-I' in FIG. 1.

Referring to FIGS. 1 and 2, the lithium secondary battery may include a cathode 100 and an anode 130 disposed to face the cathode 100.

The cathode 100 may include a cathode current collector 105 and a cathode active material layer 110 on the cathode current collector 105.

For example, the cathode active material layer 110 may include a cathode active material, and if necessary, a cathode binder and a conductive material.

For example, the cathode 100 may be prepared by mixing and stirring the cathode active material, the cathode binder, and the conductive material, etc. in a dispersion medium to prepare a cathode slurry, and then applying the cathode slurry to the cathode current collector 105, followed by drying and rolling the same.

For example, the cathode current collector 105 may include stainless steel, nickel, aluminum, titanium, copper, or an alloy thereof.

For example, the cathode active material may include lithium metal oxide particles capable of reversibly intercalating and deintercalating lithium ions.

In one embodiment, the cathode active material may include lithium metal oxide particles containing nickel.

In some embodiments, the lithium metal oxide particles may include 80 mol % or more of nickel based on a total number of moles of all elements except for lithium and oxygen. In this case, it is possible to implement a lithium secondary battery having a high capacity.

In some embodiments, the lithium metal oxide particles may include 83 mol % or more, 85 mol % or more, 90 mol % or more, or 95 mol % or more of nickel based on the total number of moles of all elements except for lithium and oxygen.

In some embodiments, the lithium metal oxide particles may further include at least one of cobalt and manganese.

In some embodiments, the lithium metal oxide particles may further include cobalt and manganese. In this case, it is possible to implement a lithium secondary battery having excellent output characteristics and penetration stability.

In one embodiment, the lithium metal oxide particles may be represented by Formula 3 below.

$$Li_xNi_{(1-a-b)}CO_aM_bO_y \quad \text{[Formula 3]}$$

For example, in Formula 3, M may be at least one of Al, Zr, Ti, Cr, B, Mg, Mn, Ba, Si, Y, W, and Sr, and x, y, a and b may be in a range of $0.9 \leq x \leq 1.2$, $1.9 \leq y \leq 2.1$, and $0 \leq a+b \leq 0.5$, respectively.

In some embodiments, a+b may be in a range of $0<a+b \leq 0.4$, $0<a+b \leq 0.3$, $0<a+b \leq 0.2$, $0<a+b \leq 0.17$, $0<a+b \leq 0.15$, $0<a+b \leq 0.12$, or $0<a+b \leq 0.1$.

In one embodiment, the lithium metal oxide particles may further include a coating element or a doping element. For example, the coating element or the doping element may include Al, Ti, Ba, Zr, Si, B, Mg, P, Sr, W, La, or an alloy thereof, or an oxide thereof. In this case, it is possible to implement a lithium secondary battery having more improved life-span characteristics.

For example, the cathode binder may include an organic binder such as polyvinylidene fluoride (PVDF), vinylidene fluoride-hexafluoropropylene copolymer (PVDF-co-HFP), polyacrylonitrile, polymethyl methacrylate, etc., or an aqueous binder such as styrene-butadiene rubber (SBR). In addition, for example, the cathode binder may be used together with a thickener such as carboxymethyl cellulose (CMC).

For example, the conductive material may include a carbon-based conductive material such as graphite, carbon black, graphene, and carbon nanotubes; or a metal-based conductive material including tin, tin oxide, titanium oxide, or a perovskite material such as $LaSrCoO_3$, and $LaSrMnO_3$.

For example, the anode 130 may include an anode current collector 125 and an anode active material layer 120 on the anode current collector 125.

For example, the anode active material layer 120 may include an anode active material, and if necessary, an anode binder and a conductive material.

For example, the anode 130 may be prepared by mixing and stirring the anode active material, the anode binder, the conductive material, etc. in a solvent to prepare an anode slurry, and then applying the anode slurry to the anode current collector 125, followed by drying and rolling the same.

For example, the anode current collector 125 may include gold, stainless steel, nickel, aluminum, titanium, copper or an alloy thereof, and preferably, includes copper or a copper alloy.

For example, the anode active material may be a material capable of intercalating and deintercalating lithium ions. For example, the anode active material may include a lithium alloy, a carbon-based active material, a silicon-based active material and the like.

For example, the lithium alloy may include aluminum, zinc, bismuth, cadmium, antimony, silicon, lead, tin, gallium, indium and the like.

For example, the carbon-based active material may include crystalline carbon, amorphous carbon, carbon composite, carbon fiber and the like.

For example, the amorphous carbon may include hard carbon, cokes, mesocarbon microbead (MCMB) calcined at 1500° C. or lower, mesophase pitch-based carbon fiber (MPCF) or the like. For example, the crystalline carbon may include natural graphite, graphite cokes, graphite MCMB, graphite MPCF and the like.

In one embodiment, the anode active material may include a silicon-based active material. For example, the silicon-based based active material may include Si, $SiO_x$ ($0<x<2$), Si/C, SiO/C, Si-metal and the like. In this case, it is possible to implement a lithium secondary battery having a high capacity.

For example, when the anode active material includes the silicon-based active material, there may be a problem in that a thickness of the battery is increased at the time of repeated charging and discharging. The lithium secondary battery according to exemplary embodiments may include the above-described electrolyte to relieve a thickness increase rate of the battery.

In some embodiments, the silicon-based active material in the anode active material may be included in a content of 1 to 20 wt. %, 1 to 15 wt. %, or 1 to 10 wt. %.

The anode binder and the conductive material may be substantially the same as or similar to the above-described cathode binder and the conductive material. For example, the anode binder may be an aqueous binder such as styrene-butadiene rubber (SBR). In addition, for example, the anode binder may be used together with a thickener such as carboxymethyl cellulose (CMC).

In one embodiment, a separation membrane 140 may be interposed between the cathode 100 and the anode 130.

In some embodiments, the anode 130 may have an area greater than that of the cathode 100. In this case, lithium ions generated from the cathode 100 may smoothly move to the anode 130 without precipitation in the middle.

For example, the separation membrane 140 may include a porous polymer film made of a polyolefin polymer such as ethylene homopolymer, propylene homopolymer, ethylene/butene copolymer, ethylene/hexene copolymer, ethylene/methacrylate copolymer or the like. Alternatively, for example, the separation membrane 140 may include a non-woven fabric made of glass fiber having a high melting point, polyethylene terephthalate fiber or the like.

For example, an electrode cell may be formed including the cathode 100, the anode 130 and the separation membrane 140.

For example, a plurality of electrode cells may be laminated to form an electrode assembly 150. For example, the electrode assembly 150 may be formed by winding, lamination, z-folding, etc. the separation membrane 140.

The lithium secondary battery according to exemplary embodiments may include: a cathode lead 107 connected to the cathode 100 and protruding to an outside of a case 160; and an anode lead 127 connected to the anode 130 and protruding to the outside of the case 160.

For example, the cathode 100 and the cathode lead 107 may be electrically connected with each other. Similarly, the anode 130 and the anode lead 127 may be electrically connected with each other.

For example, the cathode lead 107 may be electrically connected to the cathode current collector 105. In addition, the anode lead 127 may be electrically connected to the anode current collector 125.

For example, the cathode current collector 105 may include a protrusion part (cathode tab, not illustrated) on one side. The cathode active material layer 110 may not be formed on the cathode tab. The cathode tab may be formed integrally with the cathode current collector 105 or may be connected thereto by welding or the like. The cathode current collector 105 and the cathode lead 107 may be electrically connected with each other through the cathode tab.

Similarly, the anode current collector 125 may include a protrusion part (anode tab, not illustrated) on one side. The anode active material layer 120 may not be formed on the anode tab. The anode tab may be formed integrally with the anode current collector 125 or may be connected thereto by welding or the like. The anode current collector 125 and the anode lead 127 may be electrically connected with each other through the anode tab.

In one embodiment, the electrode assembly 150 may include a plurality of cathodes and a plurality of anodes. For example, the plurality of cathodes and anodes may be disposed alternately with each other, and the separation membranes may be interposed between the cathodes and the anodes. Accordingly, the lithium secondary battery according to an embodiment of the present invention may include a plurality of cathode tabs and a plurality of anode tabs protruding from each of the plurality of cathodes and the plurality of anodes.

In one embodiment, the cathode tabs (or, the anode tabs) may be laminated, compressed, and welded to form a cathode tab laminate (or, an anode tab laminate). The cathode tab laminate may be electrically connected to the cathode lead 107. In addition, the anode tab laminate may be electrically connected to the anode lead 127.

For example, the electrode assembly 150 may be housed in the case 160 together with the above-described electrolyte to form a lithium secondary battery.

The lithium secondary battery may be manufactured, for example, in a cylindrical shape, a square shape, a pouch type or a coin shape.

Hereinafter, preferred examples and comparative examples of the present invention will be described. However, the following examples are only preferred examples of the present invention, and the present invention is not limited thereto.

EXAMPLES AND COMPARATIVE EXAMPLES

(1) Preparation of Electrolyte

1 M $LiPF_6$ solution (a mixed solvent of EC/EMC in a volume ratio of 25:75) was prepared.

Electrolytes of examples and comparative examples were prepared by adding additives and auxiliary additives in the contents (wt. %) described in Table 1 below to the $LiPF_6$ solution based on a total weight of the electrolyte, and mixing with each other.

(2) Preparation of Lithium Secondary Battery Sample

A cathode slurry was prepared by mixing and dispersing $Li[Ni_{0.8}Co_{0.1}Mn_{0.1}]O_2$, carbon black and polyvinylidene fluoride (PVDF) in NMP in a weight ratio of 92:5:3.

The cathode slurry was uniformly applied to a region of an aluminum foil (thickness: 15 μm) having a protrusion part (cathode tab) on one side except for the protrusion part, followed by drying and rolling the same to prepare a cathode.

An anode slurry was prepared by dispersing an anode active material in which artificial graphite, natural graphite and SiOx (0<x<2) were mixed in a weight ratio of 60:34:6, styrene-butadiene rubber (SBR) and carboxymethyl cellulose (CMC) in water in a weight ratio of 97:1:2.

The anode slurry was uniformly applied to a region of an aluminum foil (thickness: 15 μm) having a protrusion part (anode tab) on one side except for the protrusion part, followed by drying and rolling the same to prepare an anode.

An electrode assembly was formed by interposing a polyethylene separation membrane (thickness: 20 μm) between the cathode and the anode. Next, a cathode lead and an anode lead were welded and connected to the cathode tab and the anode tab, respectively.

The electrode assembly was housed in a pouch (case) so that some regions of the cathode lead and the anode lead were exposed to an outside of the pouch, followed by sealing three sides of the pouch except for a side of an electrolyte injection part.

After injecting the electrolyte prepared in the above (1) and sealing the side of the electrolyte injection part, a lithium secondary battery was prepared by impregnation for 12 hours.

TABLE 1

| | | Auxiliary additive (wt. %) | | | | |
|---|---|---|---|---|---|---|
| | GBL additive | W3 | FEC | PS | PRS | ESA |
| Example 1 | GBL I, 1 wt. % | 1 | 1 | 0.5 | 0.5 | 0.5 |
| Example 2 | GBL I, 0.1 wt. % | 1 | 1 | 0.5 | 0.5 | 0.5 |
| Example 3 | GBL I, 0.5 wt. % | 0.5 | 0.5 | 0.25 | 0.25 | 0.25 |
| Example 4 | GBL I, 3 wt. % | 1.5 | 1.5 | 1 | 1 | 1 |
| Example 5 | GBL I, 5 wt. % | 1.5 | 1.5 | 1 | 1 | 1 |
| Example 6 | GBL I, 10 wt. % | 2 | 2 | 1 | 1 | 1 |
| Comparative Example 1 | — | 1 | 1 | 0.5 | 0.5 | 0.5 |
| Comparative Example 2 | GBL II, 1 wt. % | 1 | 1 | 0.5 | 0.5 | 0.5 |
| Comparative Example 3 | GBL III, 1 wt. % | 1 | 1 | 0.5 | 0.5 | 0.5 |

The components described in Table 1 are as follows.

GBL I: 2,3-epoxy-gamma-butyrolactone

GBL II: Gamma-butyrolactone

GBL III: Gamma-methylene-gamma-butyrolactone

W3: Lithium bis(oxalato)phosphate ($LiPF_2(C_2O_4)_2$)

FEC: Fluoro ethylene carbonate

PS: 1,3-propane sultone

PRS: 1,3-propene sultone

ESA: Ethylene sulfate

Experimental Example

(1) Measurement of Direct Current Internal Resistance (C DCIR and D DCIR)

At 60% point of state-of-charge (SOC), when sequentially increasing the C-rate to 0.2C, 0.5C, 1.0C, 1.5C, 2.0C, 2.5C and 3.0C, and performing charging and discharging at the C-rate for 10 seconds, terminal points of the voltage were composed with an equation of a straight line and a slope thereof was adopted as the DCIR. Result values are described in Table 2 below.

(2) Measurement of Thickness of the Battery After High-Temperature Storage

The lithium secondary batteries of the examples and comparative examples were subjected to 0.5C CC/CV charge (4.2 V 0.05C CUT-OFF) at 25° C., then battery thickness T1 was measured.

After leaving the charged lithium secondary batteries of the examples and comparative examples under the condition of being exposed to the atmosphere at 60° C. for 3 weeks (using a thermostatic device), battery thickness T2 was measured at room temperature. The battery thickness was measured using a plate thickness measuring device (Mitutoyo, 543-490B). The battery thickness increase rate was calculated by the following equation, and result values are described in Table 2 below and shown in FIG. 3.

$$\text{Battery thickness increase rate (\%)} = (T2 - T1)/T1 \times 100\ (\%)$$

(3) Measurement of Capacity Retention Rate (Ret) After High-Temperature Storage 0.5C CC/CV charge (4.2 V, 0.05C CUT-OFF) and 0.5C CC discharge (2.7 V CUT-OFF) were repeatedly performed three times on the lithium secondary batteries of the examples and comparative examples at 25° C., then capacity C1 was measured at the third time. Thereafter, the lithium secondary batteries of the examples and comparative examples were subjected to 0.5C CC/CV charge (4.2 V 0.05C CUT-OFF). The charged lithium secondary batteries were stored at 60° C. for 3 weeks, followed by additionally leaving at room temperature for 30 minutes, and were subjected to 0.5C CC discharge (2.75 V CUT-OFF), then discharge capacity C2 was measured. The capacity retention rate was calculated by the following equation, and results thereof are described in Table 2 below and shown in FIG. 3.

$$\text{Capacity retention rate } (\%)=C2/C1\times 100(\%)$$

(4) Measurement of Direct Current Internal Resistance (DCIR) Increase Rate After High-Temperature Storage The lithium secondary batteries of the examples and comparative examples were subjected to 0.5C CC/CV charge (4.2 V 0.05C CUT-OFF) at 25° C., and then 0.5C CC discharge up to SOC 60. At SOC 60 point, the lithium secondary batteries were discharged and supplementary charged for 10 seconds, respectively, while changing C-rate to 0.2C 0.5C, 1C, 1.5C, 2C, 2.5C and 3.0C, then DCIR R1 was measured. The charged lithium secondary batteries of the examples and comparative examples were left at 60° C. for 3 weeks under a condition of being exposed to the atmosphere, followed by additionally leaving at room temperature for 30 minutes, then DCIR R2 was measured by the same method as described above. The internal resistance increase rate was calculated by the following equation, and result values are described in Table 2 below.

$$\text{Internal resistance increase rate } (\%)=(R2-R1)/R1\times 100(\%)$$

TABLE 2

| | Initial performance | | High-temperature storage | | |
|---|---|---|---|---|---|
| | | | Thickness | | DCIR |
| | C-DCIR (mΩ) | D-DCIR (mΩ) | increase rate (%) | Ret. (%) | increase rate (%) |
| Example 1 | 30.7 | 32.7 | 59 | 81 | 37 |
| Example 2 | 31.0 | 32.1 | 60 | 88 | 39 |
| Example 3 | 29.4 | 31.3 | 57 | 89 | 34 |
| Example 4 | 29.0 | 30.8 | 55 | 90 | 36 |
| Example 5 | 30.4 | 31.4 | 56 | 82 | 35 |
| Example 6 | 30.9 | 31.9 | 54 | 83 | 40 |
| Comparative Example 1 | 27.2 | 30.1 | 80 | 82 | 43 |
| Comparative Example 2 | 30.0 | 31.9 | 79 | 89 | 39 |
| Comparative Example 3 | 30.7 | 32.0 | 75 | 88 | 41 |

As can be confirmed from Table 2, the lithium secondary batteries of the examples exhibited excellent results in the evaluation of high-temperature storage performance (i.e., thickness increase rate, capacity retention rate and resistance increase rate).

For example, in the case of the lithium secondary batteries of the examples, an effect of reducing the thickness increase rate (i.e., an effect of reducing the gas generation rate) was significantly improved.

For example, it was confirmed that the lithium secondary batteries of the examples had excellent high-temperature capacity retention rate.

For example, the lithium secondary batteries of the examples had an improved effect of reducing the resistance increase rate compared to the lithium secondary batteries of the comparative example.

What is claimed is:

1. An electrolyte for a lithium secondary battery comprising:

a lithium salt;

an organic solvent; and an additive including a lactone compound represented by Formula 1 below:

[Formula 1]

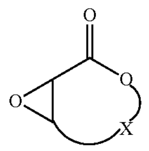

In Formula 1, X is a substituted or unsubstituted $C_1$-$C_5$ alkylene group, wherein the substituted $C_1$-$C_5$ alkylene group is the alkylene group in which at least one hydrogen of the alkylene group is substituted with substituent selected from the group consisting of a halogen, a $C_1$-$C_6$ alkyl group, a $C_2$-$C_6$ alkenyl group, an amino group, a $C_1$-$C_6$ alkoxy group, a $C_3$-$C_7$ cycloalkyl group, and a 5- to 7-membered heterocycloalkyl group.

2. The electrolyte for the lithium secondary battery according to claim 1, wherein the X is an unsubstituted $C_1$-$C_3$ alkylene group.

3. The electrolyte for the lithium secondary battery according to claim 1, wherein the lactone compound represented by Formula 1 includes 2,3-epoxy-γ-butyrolactone.

4. The electrolyte for the lithium secondary battery according to claim 1, wherein the additive is included in an amount of 0.1% to 10% by weight based on a total weight of the electrolyte.

5. The electrolyte for the lithium secondary battery according to claim 1, wherein the additive is included in an amount of 0.5% to 5% by weight based on the total weight of the electrolyte.

6. The electrolyte for the lithium secondary battery according to claim 1, wherein the electrolyte further comprises at least one auxiliary additive selected from the group consisting of a cyclic carbonate compound, a fluorine-substituted cyclic carbonate compound, a sultone compound, a cyclic sulfate compound and an oxalatophosphate compound.

7. The electrolyte for the lithium secondary battery according to claim 6, wherein the at least one auxiliary additive is included in an amount of 1% to 10% by weight based on the total weight of the electrolyte.

8. The electrolyte for the lithium secondary battery according to claim 6, wherein a weight ratio of the at least one auxiliary additive to a weight of the additive in the electrolyte is 0.5 to 10.

9. The electrolyte for the lithium secondary battery according to claim 1, wherein the organic solvent includes a cyclic carbonate solvent and a linear carbonate solvent.

10. A lithium secondary battery comprising:

a cathode which comprises a lithium metal oxide as a cathode active material;

an anode disposed to face the cathode; and the electrolyte for the lithium secondary battery according to claim 1.

11. The lithium secondary battery according to claim 10, wherein the cathode active material includes a lithium metal oxide containing nickel.

12. The lithium secondary battery according to claim 10, wherein the anode includes a silicon-based active material as an anode active material.

* * * * *